United States Patent Office 2,873,443
Patented Feb. 10, 1959

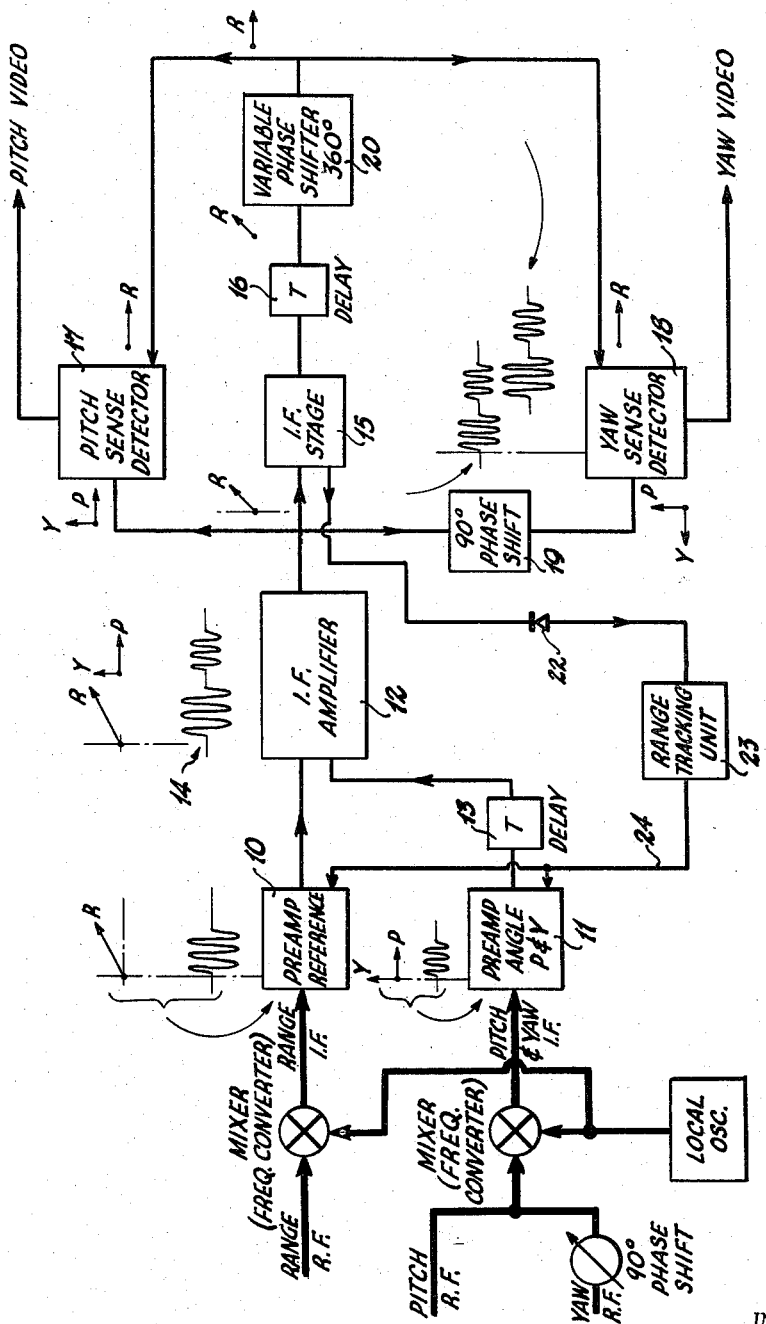

2,873,443
RADAR SYSTEM

Bernard Raboy, Glencoe, Md., assignor to The Martin Company, Middle River, Md., a corporation of Maryland Application November 4, 1955, Serial No. 544,964

5 Claims. (Cl. 343—16)

This invention relates to a pulse-echo position indicating system and to systems of this type adapted to convey position information to a remote point or central station. More particularly, the present invention relates to a novel circuit to be employed in systems of this character, which circuit will function at an intermediate frequency to amplify signals indicative of positional information in order to increase the signals to a level where they can be conveniently detected.

Prior to the present invention, it has been proposed in mono-pulse-echo position indicating systems (simultaneous lobing systems), such as radar systems, to employ three distinct intermediate frequency amplifiers, each of which individually serves to amplify components of position information and more specifically range, pitch and yaw. In systems employing three I. F. amplifiers to build up signal information, it has been necessary to gain and phase track the three amplifiers in order to obtain satisfactory performance. Good tracking is extremely difficult to achieve and for this reason it is frequently necessary to carefully select the electronic components of the I. F. amplifiers in order to offset these difficulties.

It is accordingly an object of the present invention to provide a circuit, including a single I. F. amplifier, to replace the three I. F. amplifiers heretofore used in pulse-echo position indicating systems of this character. This will have the effect of reducing the tube complement required. By using a single I. F. amplifier the necessity for gain tracking and phase tracking is eliminated and further it has been discovered that a single I. F. amplifier can be made according to the teachings of the present invention which will not to any material extent degrade the signal to noise ratio.

It is a further object of the present invention to provide novel means for combining and recombining three aspects of positional information so as to use one I. F. amplifier in pulse indicating systems which will efficiently and expediently function to amplify the various components of position information to a satisfactory level in order that this information may be readily detected.

Further objects and advantages of the present invention will become more readily apparent as the following description progresses when taken in conjunction with the sole figure of the drawing which shows schematically a preferred form of the novel circuit of the present invention.

Referring now to the sole figure, a preferred form of the present invention will be described. The basis for the operation of the circuit is to delay a resultant angle signal (which is the effect of pitch and yaw having been combined in quadrature) by an amount of time approximately equal to the pulse width of the transmitted signal. By this arrangement it is possible to combine and amplify the range information, which will serve as a reference signal, and a delayed angle signal carrying pitch and yaw information concomitantly in an I. F. amplifier with suitable provision being made for subsequent detection of the signals. Range information is coupled to a pre-amplifier 10. The angle signal, which in effect is pitch and yaw combined in quadrature, is coupled to an identical pre-amplifier 11. Combining the pitch and yaw signals can be accomplished in several ways. One technique suitable for this purpose involves passing the R. F. pitch signal and R. F. yaw signal through separate R. F. phase shifters, or in adjustment of the local oscillator phase in order to obtain the proper alignment and phasing for combining in quadrature and thereafter introducing the signals into a mixer stage. The output of the mixer stage would eventually be fed to preamplifier 11 after having been converted from R. F. to I. F. Both pre-amplifiers have low noise characteristics. The output from the pre-amplifier 10 is fed directly to main I. F. amplifier 12 while the combined angle signal coupled to pre-amplifier 11 is fed to the I. F. amplifier 12 after first introducing a time delay by I. F. network 13 approximately equal to the pulse width.

Amplification is provided in the I. F. amplifier 12 to provide a signal level suitable for detection. The signal output from the I. F. amplifier 12 is graphically shown just above the I. F. amplifier 12 and identified generally by the numeral 14.

The output from the I. F. amplifier 12 is coupled to an I. F. stage 15 and then to an I. F. delay network 16 which functions to delay the signal handled approximately the same time as the signal from pre-amplifier 11 is delayed. In other words the delay networks 13 and 16 introduce the same delay time. The output from the delay network 16 now makes the reference signal coincident in time with the angle signal at the output of I. F. amplifier 12. It is thus possible to combine the angle signal with the reference signal and obtain a video output. Sense detectors 17 and 18 are provided in order to obtain video outputs which will respectively indicate pitch and yaw. These sense detectors 17 and 18 have the property of accepting signals in or 180° out of phase and rejecting those in quadrature or those signals which appear alone in time.

I. F. stage 15 is an amplification stage and functions essentially to compensate for loss in signal energy in passing through delay network 16 and variable phase shifter 20.

In order to derive one angle video output, as, for example, pitch from sense detector 17, one output from the I. F. amplifier 12 is fed directly to the sense detector 17 and at the same time another output is indirectly fed to detector 17 through I. F. stage 15 and delay network 16. It will be apparent that the reference portion appearing at the sense detector 17 appears simultaneously with the angle portion of the combined signal at sense detector 17. On the other hand, the angle portion of the combined signal fed directly to the sense detector 17 will appear at the same time as the range or reference portion of the signal fed indirectly. Thus, the sense detector 17 will reject all but those two portions which appear simultaneously in point of time and of them will reject the yaw portion of the angle signal since it is in quadrature with the pitch portion.

In order to derive the other angle video output, the output from I. F. amplifier 12 is fed through a 90° phase shifter 19 and then to sense detecor 18. The output from I. F. amplifier 12 which has been fed through the I. F. stage 15 and delay network 16 is likewise fed to the sense detector 18. Thus, the angle portion of the signal from phase shifter 19 now occurs together in point of time with the range or reference portion of the signal from delay network 16. Further, the yaw part of the angle portion is now in or 180° out of phase with the reference or range portion of the other signal. Sense detector 18 therefore rejects the reference portion of the signal from phase shifter 19 and the angle portion of the signal from delay network 16 since they appear alone in time and the pitch part of the angle signal from phase shifter 19 since it is in quadrature with the yaw part.

Since the inclusion of two I. F. delay networks 13 and 16 are necessary, the phase relationship between the reference signal introduced into pre-amplifier 10 and the angle signal introduced into pre-amplifier 11 is subject to large variations. On account of this it is desirable to include a fine tuning 360° phase shifting network in order to line up the reference and angle signals at the sense detectors 17 and 18. This fine phase shifter is shown in the drawing as block 20 and is an I. F. phase shifter.

A desirable refinement of the present invention is afforded by providing gate or time selection for the I. F. pre-amplifier stages 10 and 11. This is necesasry in order not to degrade the signal-to-noise ratio, as the signals pass through the system and to attain a signal-to-noise ratio similar to that attainable by using three separate I. F. amplifiers. The difficulty arises from superimposing the two pre-amplifier outputs in a common I. F. channel. Accordingly, the noise in the reference channel when combined with the noise in the angle channel will be approximately 1.4 times greater if the noise is random and of substantially equal amplitude in each channel. The time selection procedure would allow the range or reference and angle signals to be amplified without the addition of noise from the other pre-amplifier. In effect, by gating, the several units would be operative only during reception of signals. By adopting a gating procedure, the system would be no more susceptible to altitude return than a system using three separate I. F. amplifiers. This will be evident from a consideration of the fact that passing through altitude return with the system of the present invention would take the same amount of time as that consumed with presently known systems.

In the drawing an arrangement is shown to provide the desired gate or time selection for the I. F. preamplifier stages 10 and 11. For this purpose, the I. F. stage 15 is coupled via a detector 22 to a range tracking unit 23. Included in the range tracking unit 23 is a multivibrator which is connected by line 24 to preamplifiers 10 and 11 and which serves to hold these elements off or inoperative until a target signal is due to arrive. The range tracking unit 23 includes means for comparing a target pulse position with that of the tracking gate. If the target pulse occurs in the middle of the tracking gate no error signal is derived. If the target pulse ocurs other in the middle of the tracking gate an error signal is derived which controls the operation of the multivibrator. This error signal is likewise fed back into the range tracking unit 23 to control the generation of the tracking gate. In effect the range tracking unit 23 predicts when the next target signal will arrive at the preamplifiers 10 and 11 by tracking a series of target signals and maintains these units off until the next target signal is due to arrive. Range tracking units of the type suitable for incorporation into the apparatus of the present invention are discussed in detail in volume 20 of the M. I. T. Radiation Series, entitled "Electronic Time Measurements," and especially in chapters 8 and 9 entitled "Techniques of Automatic Time Measurements" and "Systems for Automatic Time and Position Measurements," respectively.

It is essential that the I. F. preamplifier 11 establish a desirable noise ratio before the delay network 13. Some attenuation will occur in delaying the signal which, in the present instance, will be delayed by .5 microsecond. By incorporating the delay after the pre-amplifier 11 the signal-to-noise ratio will remain relatively constant. Attenuation before the low noise stage 11 would tend to lower signal amplitude and not noise, seriously degrading the signal-to-noise ratio and the ability of the system to angle track and range track.

Although the present invention has been shown and described with reference to a preferred embodiment, it will be appreciated that various changes and modifications obvious to one skilled in the art are within the spirit and contemplation of the invention.

What is claimed is:

1. In a monopulse echo position indicating system, the improvement comprising a single I. F. amplifier adapted to concomitantly amplify three aspects of positional information, means for feeding a first aspect of positional information to said I. F. amplifier to serve as a reference, means for combining the second and third aspects of positional information in quadrature, means for delaying said second and third aspects of positional information with respect to said first aspect, and for feeding said delayed information to said I. F. amplifier, means connected to the output of said I. F. amplifier for delaying and adjusting said first aspect to serve as a reference by re-establishing the original time relationships existing between said first aspect, and said second and third aspects, and sense detector means operative in conjunction with said reference for converting said I. F. positional information into video positional information.

2. The indicating system as defined in claim 1 in which positional information is fed to a first sense detector to provide a video output representative of a first angular coordinate, and via a 90° phase shifter to a second sense detector to provide a video output representative of a second angular coordinate, said delay and adjustment means connected to the output of said I. F. amplifier causing the reference portion of the combined signal to occur in point of time with the angle portion of the signal in each sense detector, each sense detector accepting signals in phase or 180° out of phase, but rejecting signals in quadrature.

3. The indicating system as defined in claim 2 including a fine tuning 360° phase shifting network for providing fine adjustment for said reference portion of the signal in combining with said angle portions at said sense detectors.

4. In a monopulse echo position indicating system, the improvement comprising a single I. F. amplifier adapted to amplify three aspects of positional information including range, pitch and yaw, means for feeding range information to said I. F. amplifier to serve as a reference, means for combining pitch and yaw information in quadrature, means for delaying said pitch and yaw information with respect to said reference, and for feeding said delayed information to said I. F. amplifier, means connected to the output of said I. F. amplifier for delaying and adjusting said range information for reference purposes by re-establishing the original time relationships existing between said range information, and said pitch and yaw information, and sense detector means operative in conjunction with said reference for converting said I. F. positional information into video positional information.

5. The indicating system as defined in claim 4 including means for providing preamplification for said reference and said pitch and yaw information, and means for gating said preamplification means to prevent degradation of noise figure when reference information and pitch and yaw information are combined prior to being amplified by said I. F. amplifier.

References Cited in the file of this patent
UNITED STATES PATENTS 2,628,350    Page  ----------------- Feb. 10, 1953